Sept. 10, 1929.  L. F. KENNEDY  1,727,989
ELECTRIC DISTRIBUTION SYSTEM
Filed Feb. 14, 1928
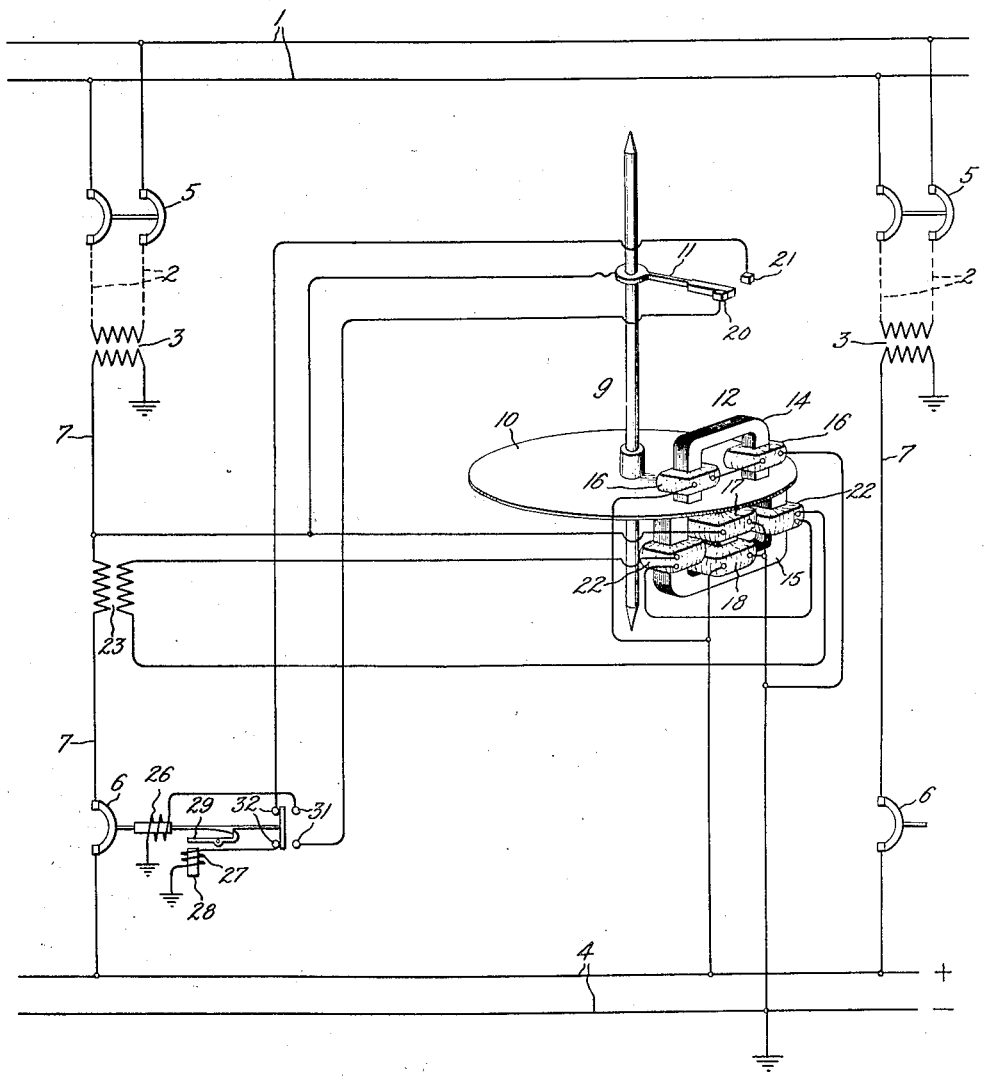
Inventor:
Luke F. Kennedy,
by Charles E. Tullar
His Attorney.

Patented Sept. 10, 1929.

1,727,989

UNITED STATES PATENT OFFICE.

LUKE F. KENNEDY, OF SCHENECTADY, NEW YORK, ASSIGNOR TO GENERAL ELECTRIC COMPANY, A CORPORATION OF NEW YORK.

ELECTRIC DISTRIBUTION SYSTEM.

Application filed February 14, 1928. Serial No. 254,300.

My invention relates to electric distribution systems and particularly to alternating current distribution systems in which high voltage feeders supply distribution transformers interconnected on their low voltage sides to form an alternating current network.

In an alternating current distribution system provided with a plurality of high voltage feeders a failure in one of the feeders does not necessarily result in a failure of the power supplied to the network since the sound feeders may be capable of maintaining continuity of service. However, if a feeder is disconnected at its source of supply or a short-circuit occurs on the feeder a reversal of energy flow will occur as a result of the network supplying the magnetizing current for the transformers or as a result of the network feeding power into a fault or short-circuit on the feeder. It then becomes necessary to disconnect the distribution transformers to prevent feed back of energy from the network. It is also desirable to reconnect the distribution transformer to the network when normal conditions have been restored on the feeder.

One object of my invention is to provide an improved arrangement for automatically effecting the disconnection of distribution transformers from a network on a reversal of energy flow through the transformer and for reconnecting the transformers to the network when normal conditions have been restored.

For the purpose of explaining the present invention it has been illustrated in the accompanying drawing as applied to an alternating current distribution with an interconnected secondary system but it will be understood that it may be applied to other systems of electric distribution and in general to two interconnected alternating current circuits which are subject to a reversal of energy flow between them.

My invention will be better understood from the following description taken in connection with the accompanying drawing in which the single figure is a schematic illustration of an alternating current distribution system in which my invention has been embodied and its scope will be pointed out in the appended claims.

Referring to the drawing, 1 indicates the primary high voltage mains of a distribution system connected to high voltage feeders 2 supplying distribution transformers 3 which are interconnected on their low voltage sides by the distribution network 4. In order to simplify the disclosure I have shown the network as having one side thereof permanently connected to ground. Suitable switching means such as circuit breakers 5, which may be of any suitable type examples of which are well known in the art, are provided in the main feeders 2 while other suitable switching means such as the network circuit breakers 6 are provided in the low voltage mains 7 between the secondaries of the distribution transformers 3 and the network 4. In order to simplify the disclosure single phase feeders are shown and only one feeder is shown equipped with the apparatus for effecting the automatic disconnection and reconnection of the transformer secondary but it will be understood that each feeder or any desirable number of feeders may be similarly equipped.

The opening and reclosing of a circuit breaker 6 is controlled by an induction relay 9 of the so-called watt or power type and comprises a movable conducting member such as a disk 10 by the movement of which the contact controlling member 11 is actuated. The movement of the disk 10 is effected by an induction motor element 12 which comprises the magnetic members or cores 14 and 15 between the pole faces of which the disk 10 is interposed so as to be rotatable across the magnetic fields of the members. On one of the magnetic members is mounted in any suitable manner the voltage winding 16 which is connected so as to be responsive to the voltage of one of the circuits to be connected together by the circuit breaker 6. Preferably this winding is connected across the network 4. On the other magnetic member are mounted the differentially wound voltage windings 17 and 18 which are respectively connected across the secondary of the transformer 3 and the network 4. These windings, 16, 17 and 18 are arranged in any suitable manner, examples of which are well known in the art, so that they cooperate to exert on the disk 10 a torque which is proportional to $$E_N \times (E_T - E_N) \times \cos(\varphi - Y)$$

where $E_N$ represents the magnitude of the network voltage, $E_T$ represents the magnitude of the transformer secondary voltage, $\varphi$ represents the phase angle between the network voltage and the resultant voltage difference between the network and transformer secondary voltages and $Y$ is a predetermined angle. The angle $Y$ may be made any desired value, in order to change the operating characteristics of the relay, by varying the electrical constants of the circuits of the relay windings or in any other suitable manner examples of which are well known in the art.

The relay 9 is designed so that when the $\cos(\varphi - Y)$ is positive a torque is exerted on the disk 10, in a direction to move the contact controlling member 11 into engagement with contact 20 and when the $\cos(\varphi - Y)$ is negative a torque is exerted on the disk 10 in a direction to move the member 11 into engagement with contact 21. Therefore when the transformer secondary and the network voltages are in phase it is necessary for the transformer secondary voltage to exceed the network voltage in order to produce a torque in a direction to move the member 11 into engagement with contact 20. Furthermore if the angle $Y$ is made zero it is evident that the transformer secondary voltage must always exceed the network voltage in order to produce a torque in a direction to move the member into engagement with contact 20 and therefore the circuit breaker 6 can be reclosed only when the transformer secondary voltage exceeds the network voltage. In some cases, however, it is desirable to have $Y$ equal to some other value than zero in order to limit the reclosing of the circuit breaker 6 to a relatively small range of phase difference between the transformer secondary and network voltage during which the transformer voltage lags the network voltage.

Since it is necessary for the transformer secondary voltage to be greater or smaller than the network voltage in order to produce a torque on the disk 10 when the two voltages are in phase it will be noted that when the three windings 16, 17 and 18 are simultaneously energized by the same voltage which is the condition when the circuit breaker 6 is closed the torque exerted on the disk 10 by the cooperation of these three windings is zero.

There is also mounted on the same magnetic member on which the voltage windings 17 and 18 are mounted a current winding 22 which is connected to the secondary of a current transformer 23 the primary of which is connected in series between the secondary of the transformer 3 and the circuit breaker 6. The current winding 22, therefore, is connected so as to be responsive to the current flowing through the circuit breaker. The windings 16 and 22 are arranged in any suitable manner so that they cooperate to exert on the disk 10 a torque which varies in accordance with the direction of power flow between the secondary of the transformer 3 and the network 4. Preferably the windings are arranged so that when power is flowing from the transformer secondary to the network the torque is in a direction to maintain the contact controlling member 11 in engagement with contact 20 and when reverse power is flowing from the network through the circuit breaker 6 the torque is in the opposite direction so as to maintain the contact controlling member 11 in engagement with contact 21.

As shown the circuit breaker 6 is of the well known latched-in type and is provided with the closing coil 26 and a trip coil 27 having a plunger 28 to disengage a latch 29 which holds the circuit breaker closed. The circuit breaker 6 is also provided with auxiliary contacts 31 which are connected in series with the contact 20 of the relay 9 in the circuit of the closing coil 26 and with the auxiliary contacts 32 which are connected in series with the contact 21 in the circuit of the trip coil 28.

It will be obvious to those skilled in the art that when polyphase feeders are used a separate relay 9 may be provided for each phase and that with such an arrangement the contacts of the relays 9 may be interconnected in a manner well known in the art so that whenever any one of the contact controlling members is in engagement with its contacts 21 the circuit of the trip coil 27 is completed, and the circuit of the closing coil 26 is completed only when all of the contact controlling members are in engagement with their contacts 20.

The operation of the arrangement shown in the drawing is as follows: Assume that the network 4 is energized by one of the other feeders and that the circuit breakers 5 and 6 in the feeder which is equipped with the automatic reclosing equipment are in their open positions.

Under these conditions the voltage windings 16 and 18 are energized in response to the voltage across the network 4 and the voltage winding 17 and the current winding 22 are deenergized. Therefore, since the network voltage is greater than the transformer secondary voltage and the voltage difference between the network and the transformer secondary voltage is equal and opposite to the network voltage, the cosine of the angle between the network voltage and the voltage difference is negative so that the torque exerted at this time on the disk 10 by the cooperation of the windings 16, 17 and 18 is in a direction to maintain the contact controlling member 11 in engagement with contact 21. Since the circuit breaker 6 is open the engagement of contact controlling member 11 with contact 21 does not complete the circuit of the trip coil 27 at this time as this circuit is open at the auxiliary contact 32 on the circuit breaker 6.

Assume now that the circuit breaker 5 is moved to its closed position so that the distribution transformer 3 is energized from the supply circuit 1. The voltage winding 16 which is connected across the secondary of the transformer 3 is now energized. When the transformer secondary voltage bears a predetermined relation to the network voltage such for example as when it is slightly greater and substantially in phase with the network voltage the torque exerted by the windings 16, 17 and 18 is in a direction to move the contact controlling member 11 out of engagement with contact 21 and into engagement with contact 20. The engagement of contact controlling member 11 with contact 20 completes the circuit of the closing coil 26 of the circuit breaker 6 across the secondary of the distribution transformer 3 so that the circuit breaker 6 closes and connects the transformer to the network. The circuit of the closing coil 26 also includes the auxiliary contacts 31 on the circuit breaker. These auxiliary contacts are opened as soon as the circuit breaker closes. After the circuit breaker has been closed it is held in its closed position by the latch 29.

When the circuit breaker 6 is closed and power flows from the distribution transformer 3 to the network the current in the current winding 22 has the proper phase relation with respect to the current in the voltage winding 16 to produce a torque which causes the contact controlling member 11 to be maintained in engagement with contact 20. Therefore, the circuit breaker 6 remains closed as long as power flows from the transformer 3 to the network 4.

Let is be assumed now that the circuit breaker 5 is opened so that the transformer 3 receives its magnetizing current from the network 4. Under these conditions the direction of the power flow through the circuit breaker 6 reverses so that the relation of the current in the current winding 22 with respect to the current in the voltage winding 16 also reverses. Consequently the torque exerted on the disk 10 by the cooperation of the windings 16 and 22 of the motor element 12 reverses so that the contact controlling member 11 is moved out of engagement with contact 20 and into engagement with contact 21. In response to the engagement of contact controlling member 11 with contact 21 a circuit is completed for the trip coil 27 which actuates its plunger 28 to disengage latch 29 and thereby permit the circuit breaker 6 to move to its open position. This circuit of the trip coil 27 is completed across the secondary of the transformer 3 and also includes the auxiliary contacts 32 on the circuit breaker 6.

A similar cycle of operation takes place after a reversal of power flow through the circuit breaker 6 occurs due to a fault or short-circuit on the high tension feeder 2 or in the transformer 3.

After the circuit breaker 6 opens it will reclose again automatically when the magnitude and phase of the transformer voltage is such as to cause the torque exerted by the motor element 12 to be in a direction to move the contact controlling member 11 out of engagement with contact 21 and into engagement with contact 20.

While I have in accordance with the patent statutes shown and described my invention as applied to a particular system and as embodying various devices diagrammatically indicated changes and modifications will be obvious to those skilled in the art and I, therefore, aim in the appended claims to cover all such changes and modifications as fall within the true spirit and scope of my invention.

What I claim as new and desire to secure by Letters Patent of the United States is:—

1. In a system of electric distribution including two alternating current circuits and switching means for connecting said circuits together, means for effecting the automatic opening and reclosing of said switching means including a rotatable member, and an induction motor element including a voltage winding responsive to the voltage of one of said circuits and a current winding responsive to the current flowing through said switching means arranged to exert a torque on said member in accordance with the direction of power flow through said switching means when it is closed, and two differentially wound voltage windings respectively responsive to the voltages across said circuits and arranged to cooperate with said first mentioned voltage winding to exert a torque on said member in accordance with the relative phases and magnitudes of the voltages of said circuits.

2. In a system of electric distribution including two alternating current circuits and switching means for connecting said circuits together, means for effecting the automatic reclosing of said switching means including a rotatable member, two magnetic members in inductive relation with said rotatable member, a voltage winding responsive to the voltage of one of said circuits mounted on one of said members and two differentially wound voltage windings respectively responsive to the voltages of said circuits mounted on the other of said magnetic members.

3. In a system of electric distribution including two alternating current circuits and switching means for connecting said circuits together, means for effecting the automatic opening and reclosing of said switching means including a rotatable member, two magnetic members in inductive relation with said rotatable member, a voltage winding responsive to the voltage of one of said circuits mounted on one of said members, and two differentially wound voltage windings respectively responsive to the voltages of said circuits and a current winding responsive to the current flowing through said switching means mounted on the other of said magnetic members.

4. In a system of electric distribution including an alternating current feeder circuit, a load circuit, a transformer connected between said feeder and load circuits and a circuit breaker in the secondary circuit of said transformer, the combination of a relay for controlling the reclosing of said circuit breaker including a movable conducting member, two magnetic members in inductive relation with each other and with said member, a voltage winding connected so as to be responsive to the voltage across said load circuit mounted on one of said magnetic members, and two differentially wound voltage windings respectively connected so as to be responsive to the voltages across the transformer secondary and the load circuit mounted on the other of said magnetic members.

5. In a system of electric distribution comprising an alternating current feeder circuit, a load circuit, a transformer connected between said feeder and load circuits and a circuit breaker in the secondary circuit of said transformer, the combination of a relay for controlling the opening and reclosing of said circuit breaker including a movable conducting member, two magnetic members in inductive relation with each other and with said means, a voltage winding connected so as to be responsive to the voltage across said load circuit mounted on one of said magnetic members, and two differentially wound voltage windings respectively connected so as to be responsive to the voltages across the transformer secondary and the load circuit, and a current winding responsive to the current flowing through said switching means mounted on the other of said magnetic members.

In witness whereof, I have hereunto set my hand this 13th day of February, 1928.

LUKE F. KENNEDY.